United States Patent
Ichiryu

(10) Patent No.: US 10,239,352 B2
(45) Date of Patent: Mar. 26, 2019

(54) MOTORCYCLE TIRE FOR UNEVEN TERRAIN

(71) Applicant: SUMITOMO RUBBER INDUSTRIES, LTD., Kobe-shi, Hyogo (JP)

(72) Inventor: Yutaka Ichiryu, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 106 days.

(21) Appl. No.: 15/033,851

(22) PCT Filed: Oct. 2, 2014

(86) PCT No.: PCT/JP2014/076371
§ 371 (c)(1),
(2) Date: May 2, 2016

(87) PCT Pub. No.: WO2015/072240
PCT Pub. Date: May 21, 2015

(65) Prior Publication Data
US 2016/0257171 A1 Sep. 8, 2016

(30) Foreign Application Priority Data
Nov. 18, 2013 (JP) .................................. 2013-237717

(51) Int. Cl.
*B60C 11/00* (2006.01)
*B60C 9/14* (2006.01)
(Continued)

(52) U.S. Cl.
CPC ........ *B60C 11/0083* (2013.01); *B60C 9/0042* (2013.01); *B60C 9/02* (2013.01);
(Continued)

(58) Field of Classification Search
CPC .................................................. B60C 11/0083
See application file for complete search history.

(56) References Cited

U.S. PATENT DOCUMENTS

2010/0116391 A1 5/2010 Miyazaki
2010/0314019 A1 12/2010 Noda

FOREIGN PATENT DOCUMENTS

EP 1 795 376 A1 6/2007
EP 2 390 114 A1 11/2011
(Continued)

OTHER PUBLICATIONS

Machine Translation: JP-10053007-A; Ishikawa, Takeshi; no date.*
(Continued)

*Primary Examiner* — Kendra Ly
(74) *Attorney, Agent, or Firm* — Birch, Stewart, Kolasch & Birch, LLP

(57) ABSTRACT

[Object] A motorcycle tire, for an uneven terrain, which exhibits both impact absorption and handling stability is provided.
[Solution] A tire 2 includes a pair of rubber reinforcing layers 14 disposed inward of a carcass 10 near ends, respectively, of a tread surface 16. A profile of the tread surface 16 is formed by: an arc C1 that is disposed at a center, and that projects outward in a radial direction; and a pair of arcs C2 each of which is disposed outward of the arc C1 in an axial direction and each of which projects outward in the radial direction. The arc C1 contacts with the arcs C2. A radius R1 of curvature of the arc C1 is less than a radius R2 of curvature of each arc C2. Outer ends 40 of the rubber reinforcing layers 14 are disposed outward of ends TE of the tread surface 16 in the radial direction. Inner ends 42 of the rubber reinforcing layers 14 are disposed inward of the ends
(Continued)

TE of the tread surface 16 in the radial direction. The rubber reinforcing layers 14 are not disposed on an equator plane.

3 Claims, 3 Drawing Sheets

(51) Int. Cl.
  *B60C 17/00* (2006.01)
  *B60C 9/00* (2006.01)
  *B60C 9/02* (2006.01)
  *B60C 13/00* (2006.01)
  *B60C 15/00* (2006.01)
  *B60C 11/11* (2006.01)
  *B60C 9/04* (2006.01)

(52) U.S. Cl.
  CPC ............... *B60C 9/14* (2013.01); *B60C 13/00* (2013.01); *B60C 15/00* (2013.01); *B60C 17/0009* (2013.01); *B60C 9/04* (2013.01); *B60C 11/11* (2013.01); *B60C 2009/0035* (2013.01); *B60C 2009/0078* (2013.01); *B60C 2017/0072* (2013.01); *B60C 2200/10* (2013.01); *B60C 2200/14* (2013.01)

(56) References Cited

FOREIGN PATENT DOCUMENTS

| | | | |
|---|---|---|---|
| FR | 2 623 753 A1 | | 6/1989 |
| JP | 1-233106 A | | 9/1989 |
| JP | 2001-277824 A | | 9/1989 |
| JP | 2-151502 A | | 6/1990 |
| JP | 02151502 A | * | 6/1990 |
| JP | 10-53007 A | | 2/1998 |
| JP | 10053007 A | * | 2/1998 |
| JP | 2008-155658 A | | 7/2008 |
| JP | 2008-296831 A | | 12/2008 |
| JP | 2009-126408 A | | 6/2009 |
| JP | 2009126408 A | * | 6/2009 ............. B60C 5/142 |
| JP | 2011-57184 A | | 3/2011 |

OTHER PUBLICATIONS

Machine Translation: JP-2009126408-A; Noda, Kuraji; no date.*
Machine Translation: JP02151502A; Sakuno, Tetsuya; no date.*
International Search Report for PCT/JP2014/076371 dated Dec. 2, 2014.
Written Opinion of the International Searching Authority for PCT/JP2014/076371 dated Dec. 2, 2014.
Extended European Search Report dated May 19, 2017, in European Patent Application No. 14862286.3.

* cited by examiner

MOTORCYCLE TIRE FOR UNEVEN TERRAIN

TECHNICAL FIELD

The present invention relates to motorcycle tires for uneven terrains.

BACKGROUND ART

Two-wheeled automotive vehicles for running on uneven terrains run on obstacles such as uneven road surfaces, stones and rocks, and roots of trees. Motorcycle tires to be mounted to the two-wheeled automotive vehicles are required to have high impact absorption in order to stably run on these obstacles.

The two-wheeled automotive vehicle used for running on the uneven terrains may run on a road surface having a large stepped portion or may also run on a jump stand set in a course in a racing such as a motocross. Therefore, heavy load may be applied to the tires. The tires are required to exhibit handling stability for stable running also under heavy load, and maintain durability also under heavy load.

A method in which stiffness of the tire is reduced by the thickness of rubber for a tread and sidewalls being reduced, or stiffness of a carcass being reduced, may be used in order to enhance impact absorption. However, a tire having low stiffness is greatly deformed under heavy load. This deteriorates handling stability under heavy load. Further, sidewalls having low stiffness cannot allow impact from a rim to be sufficiently reduced, whereby tube puncture may be caused. This reduces durability of the tire.

Stiffness of the tire is enhanced by the thicknesses of rubber for a tread and sidewalls being increased, or stiffness of a carcass being enhanced, whereby durability and handling stability under heavy load can be improved. However, this may deteriorate impact absorption of the tire. This tire has difficulty in stably running on the obstacles.

The tire, for a two-wheeled automotive vehicle, which allows accelerating performance after landing in jump to be enhanced without deteriorating impact absorption is disclosed in JP2009-126408. In this tire, a rubber reinforcing layer is formed inward of an inner liner.

CITATION LIST

Patent Literature

Patent Literature 1: JP2009-126408

SUMMARY OF THE INVENTION

Problems to be Solved by the Invention

A motorcycle tire for an uneven terrain is required to exhibit both impact absorption and handling stability under heavy load at a higher level. The inventors have found that combination of a tread profile and a reinforcing rubber exerts a great influence on impact absorption and handling stability under heavy load in a tire. This matter is not examined for the tire disclosed in JP2009-126408.

An object of the present invention is to provide a motorcycle tire, for an uneven terrain, which is excellent in impact absorption and handling stability under heavy load.

Solution to the Problems

A motorcycle tire for an uneven terrain according to the present invention includes: a tread having an outer surface that forms a tread surface; a pair of sidewalls that extend almost inward from ends, respectively, of the tread in a radial direction; a pair of beads disposed inward of the sidewalls, respectively, in the radial direction; a carcass that is extended on and between one of the beads and the other of the beads in a portion inward of the tread in the radial direction; and a pair of rubber reinforcing layers disposed inward of the carcass near ends, respectively, of the tread surface. A profile of the tread surface is formed by: an arc C1 that is disposed at a center, and that projects outward in the radial direction; and a pair of arcs C2 each of which is disposed outward of the arc C1 in an axial direction and each of which projects outward in the radial direction. The arc C1 contacts with the arcs C2. A radius R1 of curvature of the arc C1 is less than a radius R2 of curvature of each arc C2. Outer ends of the rubber reinforcing layers are disposed outward of the ends of the tread surface in the radial direction. Inner ends of the rubber reinforcing layers are disposed inward of the ends of the tread surface in the radial direction. The rubber reinforcing layers are not disposed on an equator plane.

Preferably, a ratio (R2/R1) of the radius R2 of curvature to the radius R1 of curvature is greater than or equal to 1.1, and not greater than 1.3.

Preferably, when h represents a height, in the radial direction, from the inner end of each rubber reinforcing layer to the outer end thereof, and H represents a height, in the radial direction, from a base line to a point of intersection of the equator plane and an inner surface of the tire, a ratio (h/H) of the height h to the height H is greater than or equal to 0.4, and not greater than 0.8.

Preferably, a ratio (hu/h) of a height hu, in the radial direction, from the end of the tread surface to the outer end of the rubber reinforcing layer, relative to the height h is greater than or equal to 0.1, and not greater than 0.4.

Preferably, the rubber reinforcing layers have a maximum thickness between the outer ends and the inner ends, respectively, and the rubber reinforcing layers have a shape that is tapered from a portion having the maximum thickness toward the outer ends and the inner ends, respectively.

Preferably, the maximum thickness of each rubber reinforcing layer is greater than or equal to 0.5 mm, and not greater than 3.0 mm.

Advantageous Effects of the Invention

In the motorcycle tire for an uneven terrain according to the present invention, the profile of the tread surface is formed by the arc C1 disposed at the center, and the pair of arcs C2 each of which is disposed outward of the arc C1 in the axial direction. The radius R1 of curvature of the arc C1 is set to be less than the radius R2 of curvature of each arc C2. The profile of the center portion of the tread is formed by the arc C1 having a small radius of curvature. Therefore, the tread can be sufficiently deformed in running on an obstacle. The tire is excellent in impact absorption.

Further, the tire includes the rubber reinforcing layers disposed inward of the carcass. The outer ends of the rubber reinforcing layers are disposed outward of the ends of the tread surface in the radial direction. The inner ends of the rubber reinforcing layers are disposed inward of the ends of the tread surface. The rubber reinforcing layers contribute to enhancement of stiffness of axially outer portions (buttress portions), of the tread, having the profile formed by the respective arcs C2 having a large radius of curvature. In the tire, deformation of the tread is appropriately reduced even under heavy load. The tire is excellent in handling stability under heavy load. Further, the rubber reinforcing layers are not disposed on the equator plane. In other words, the outer ends of the rubber reinforcing layers do not reach the equator plane. The rubber reinforcing layers do not prevent deformation of the center portion, of the tread, having the profile which is formed by the arc C1 having a small radius of curvature. The tread can be sufficiently deformed in running on an obstacle. The tire is allowed to exhibit both high impact absorption and handling stability under heavy load by appropriate combination of the profile of the tread and the rubber reinforcing layers with each other.

DESCRIPTION OF EMBODIMENTS

The following will describe in detail the present invention based on preferred embodiments with reference where appropriate to the accompanying drawing.

Figure 1:
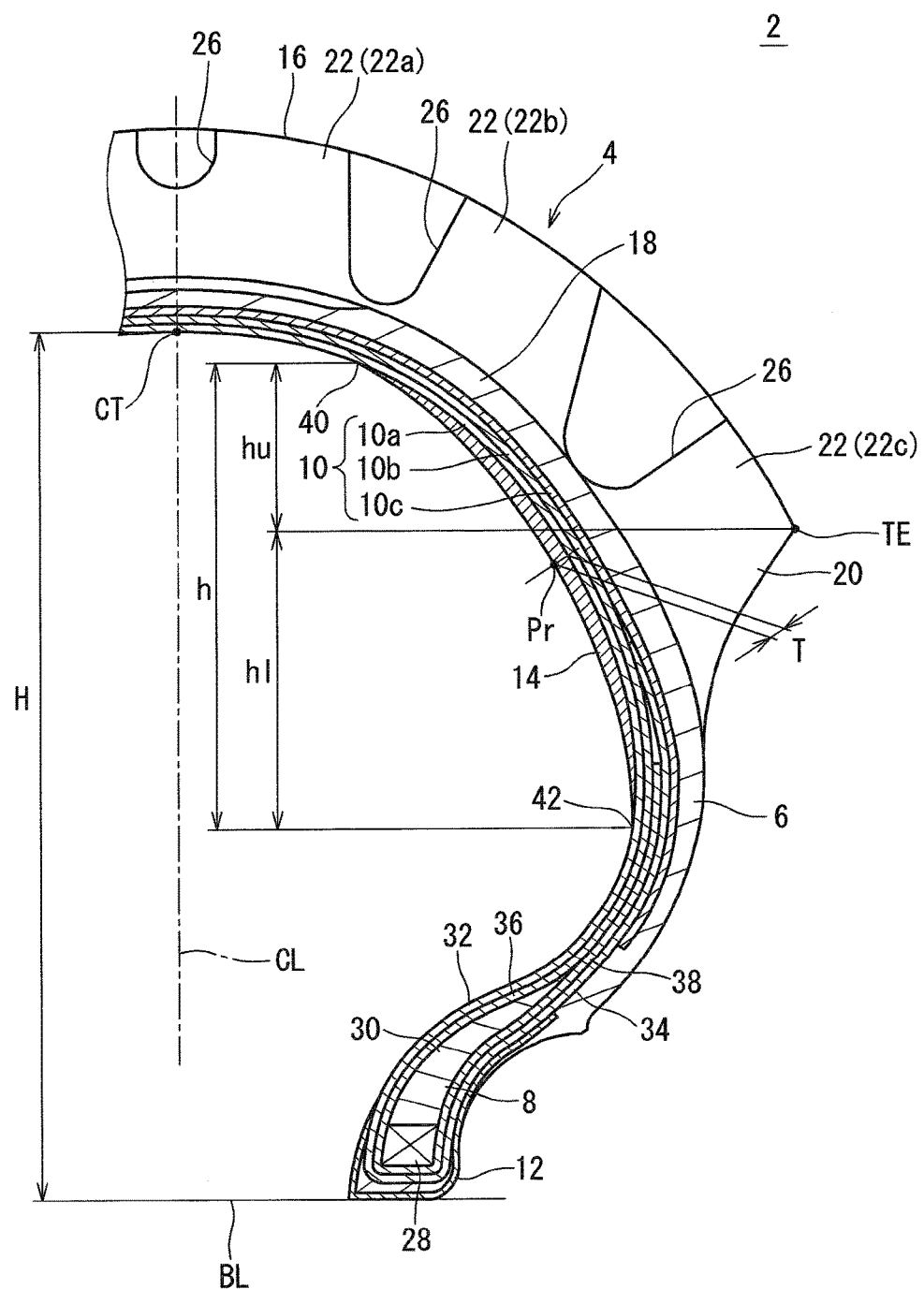
FIG. 1 is a cross-sectional view of a part of a motorcycle tire for an uneven terrain according to an embodiment of the present invention.

A motorcycle tire 2 shown in FIG. 1 is used for running on uneven terrains such as mountain forests and wilderness. The tire 2 includes a tread 4, sidewalls 6, beads 8, a carcass 10, chafers 12, and rubber reinforcing layers 14. The tire 2 is of a tube type. In FIG. 1, the upward/downward direction represents the radial direction, the leftward/rightward direction represents the axial direction, and the direction orthogonal to the surface of the sheet represents the circumferential direction. The tire 2 has a shape that is almost bilaterally symmetric about an alternate long and short dash line CL shown in FIG. 1. The alternate long and short dash line CL represents the equator plane of the tire 2.

The tread 4 has a shape projecting outward in the radial direction. The tread 4 includes a tread surface 16. The tread surface 16 can contact with a road surface. The tread 4 includes a base 18 and a main body 20. The base 18 is formed of a crosslinked rubber. The main body 20 is disposed outward of the base 18 in the radial direction. The main body 20 is formed of a crosslinked rubber. The main body 20 includes multiple blocks 22 that extend almost outward in the radial direction. On a flat and smooth road surface, the outer surfaces of the blocks 22 mainly contact with the road surface. On a soft ground, a part of the tire 2 is buried and mud is removed by the blocks 22. On the soft ground, the blocks 22 contribute to traction. In FIG. 1, reference character TE represents the end of the tread surface 16 in the axial direction.

Figure 2:
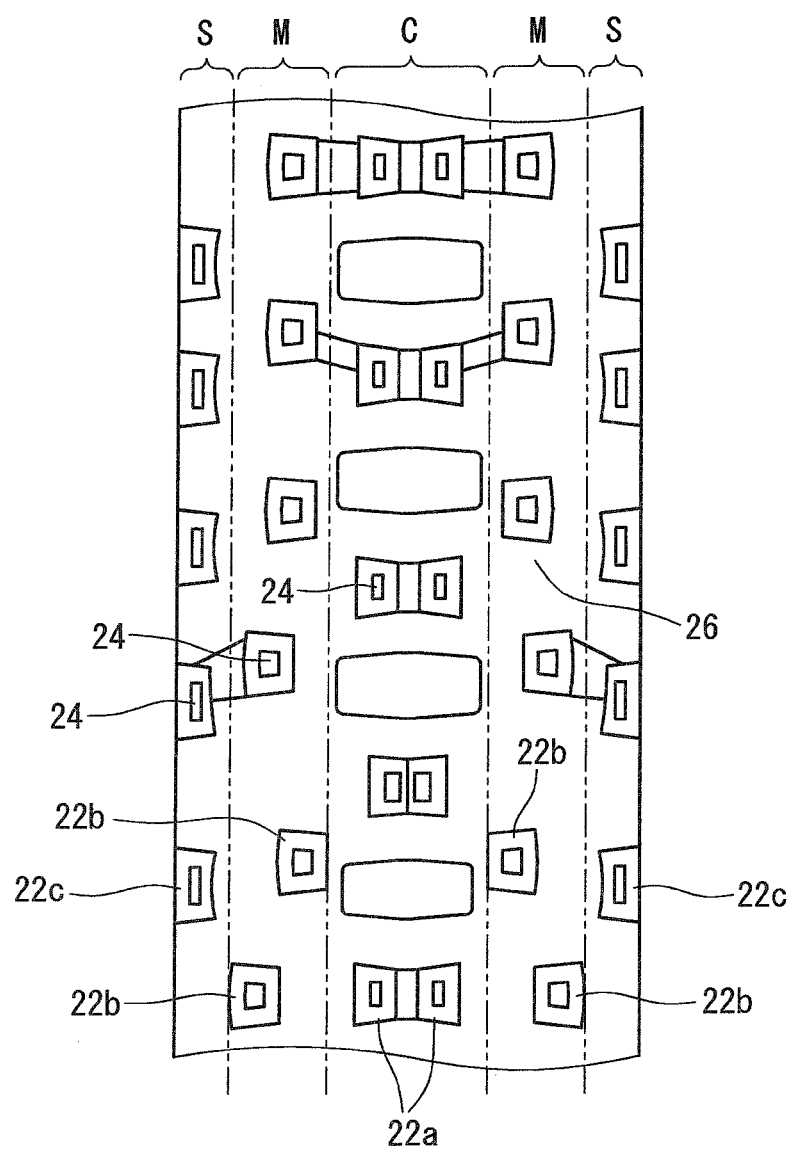
FIG. 2 is a development of a part of a tread surface of the tire shown in FIG. 1.

FIG. 2 is a development of the tread surface 16 of the tire 2. In FIG. 2, the upward/downward direction represents the circumferential direction, and the leftward/rightward direction represents the axial direction. In FIG. 2, reference character C represents a crown region, reference character M represents a middle region, and reference character S represents a shoulder region. The center region C is disposed at the center of the tread surface 16, and a pair of middle regions M is disposed outward of the center region C in the axial direction. A pair of shoulder regions S is disposed outward of the middle regions M, respectively, in the axial direction. Each block 22 disposed in the center region C is referred to as a center block 22a. Each block 22 disposed in the middle regions M is referred to as a middle block 22b. Each block 22 disposed in the shoulder regions S is referred to as a shoulder block 22c. In other words, the tread 4 of the tire 2 has the center blocks 22a, the middle blocks 22b, and the shoulder blocks 22c.

The blocks 22 each have a recess 24 in an outer surface on the radially outer side. A portion, other than the recess 24, of the outer surface of each block 22 is referred to as a land. As illustrated in the drawings, the blocks 22 adjacent to each other are separated by a groove 26. In the development, a ratio of the area of the land to the area of the groove 26 is referred to as a land/sea ratio. In the tire 2, the land/sea ratio is preferably greater than or equal to 10%, and preferably not greater than 30% in view of durability and grip performance.

The sidewalls 6 extend from ends of the tread 4 in the almost radially inward direction. The sidewalls 6 are formed of a crosslinked rubber. The sidewalls 6 absorb impact from a road surface due to its deformation. Further, the sidewalls 6 prevent external damage of the carcass 10. In the tire, the sidewalls 6 are formed integrally with the base 18.

The beads 8 are disposed almost inward of the sidewalls 6 in the radial direction. Each bead 8 includes a core 28, and an apex 30 that extends from the core 28 in the radially outward direction. The core 28 is ring-shaped. The core 28 is wound with a non-stretchable wire. A steel wire is typically used for the core 28. The apex 30 is tapered in the radially outward direction.

The carcass 10 includes a first ply 10a, a second ply 10b, and a third ply 10c. The first ply 10a and the second ply 10b are extended, on and between the beads 8 on both sides, along the inner sides of the tread 4 and the sidewalls 6. The third ply 10c is extended along the inner sides of the tread 4 and the sidewalls 6. The first ply 10a is turned up around the core 28 from the inner side toward the outer side in the axial direction. By the first ply 10a being turned up, the first ply 10a includes a first main body portion 32 and first turned-up portions 34.

The second ply 10b is layered over the first ply 10a. The second ply 10b is turned up around the core 28 from the inner side toward the outer side in the axial direction. By the second ply 10b being turned up, the second ply 10b includes a second main body portion 36 and second turned-up portions 38. The second main body portion 36 is disposed outward of the first main body portion 32 in the radial direction. The second main body portion 36 is disposed outward of the first main body portion 32 in the axial direction. The second turned-up portions 38 are disposed inward of the first turned-up portions 34 in the axial direction. In the tire 2, ends of the second turned-up portions 38 are disposed inward of ends of the first turned-up portions 34 in the radial direction. The carcass 10 may be structured such that the ends of the second turned-up portions 38 are disposed outward of the ends of the first turned-up portions 34 in the radial direction.

The first ply 10a and the second ply 10b are each formed of multiple cords aligned with each other, and a topping rubber, which is not shown. An absolute value of an angle of each cord of the first ply 10a and the second ply 10b relative to the equator plane is preferably greater than or equal to 20°, and preferably not greater than 45°. A direction in which the cords of the first ply 10a are tilted is opposite to a direction in which the cords of the second ply 10b are tilted. The cords of the first ply and the ply are each formed of an organic fiber in general. Preferable examples of the organic fiber include polyester fibers, nylon fibers, rayon fibers, polyethylene naphthalate fibers, and aramid fibers.

The third ply 10c is disposed between the second ply 10b and the base 18. The third ply 10c is layered over the second ply 10b in a portion inward of the base 18 in the radial direction. Ends of the third ply 10c are disposed inward of the ends of the first turned-up portions 34 in the radial direction. In other words, the third ply 10c is overlaid on the first turned-up portions 34. The ends of the third ply 10c may be disposed outward of the ends of the first turned-up portions 34. Unlike the first ply 10a and the second ply 10b, the third ply 10c is not turned up around the core 28.

The third ply 10c is formed of multiple cords aligned with each other, and a topping rubber, which is not shown. An absolute value of a tilt angle of the cords of the third ply 10c is preferably greater than or equal to 10°, and preferably not greater than 40°. The cords of the third ply are formed of an organic fiber in general. Preferable examples of the organic fiber include polyester fibers, nylon fibers, rayon fibers, polyethylene naphthalate fibers, and aramid fibers.

The chafers 12 are disposed near the beads 8. When the tire 2 is mounted to a rim, the chafers 12 are brought into contact with the rim. A region near each bead 8 is protected due to the contact. The chafers 12 are typically formed of a fabric and a rubber impregnated into the fabric. The chafers 12 formed merely of rubber may be used.

The rubber reinforcing layers 14 are disposed near ends TE of the tread surface 16. The rubber reinforcing layers 14 are disposed near the shoulder blocks 22c. The rubber reinforcing layers 14 are disposed inward of the carcass 10. The rubber reinforcing layers 14 are secured directly to the inner surface of the first main body portion 32. Outer ends 40 of the rubber reinforcing layers 14 are disposed outward of the ends TE of the tread surface 16 in the radial direction. The rubber reinforcing layers 14 are not disposed on the equator plane. In other words, the outer ends 40 of the rubber reinforcing layers 14 do not reach the equator plane. Inner ends 42 of the rubber reinforcing layers 14 are disposed inward of the ends TE of the tread surface 16.

Figure 3:
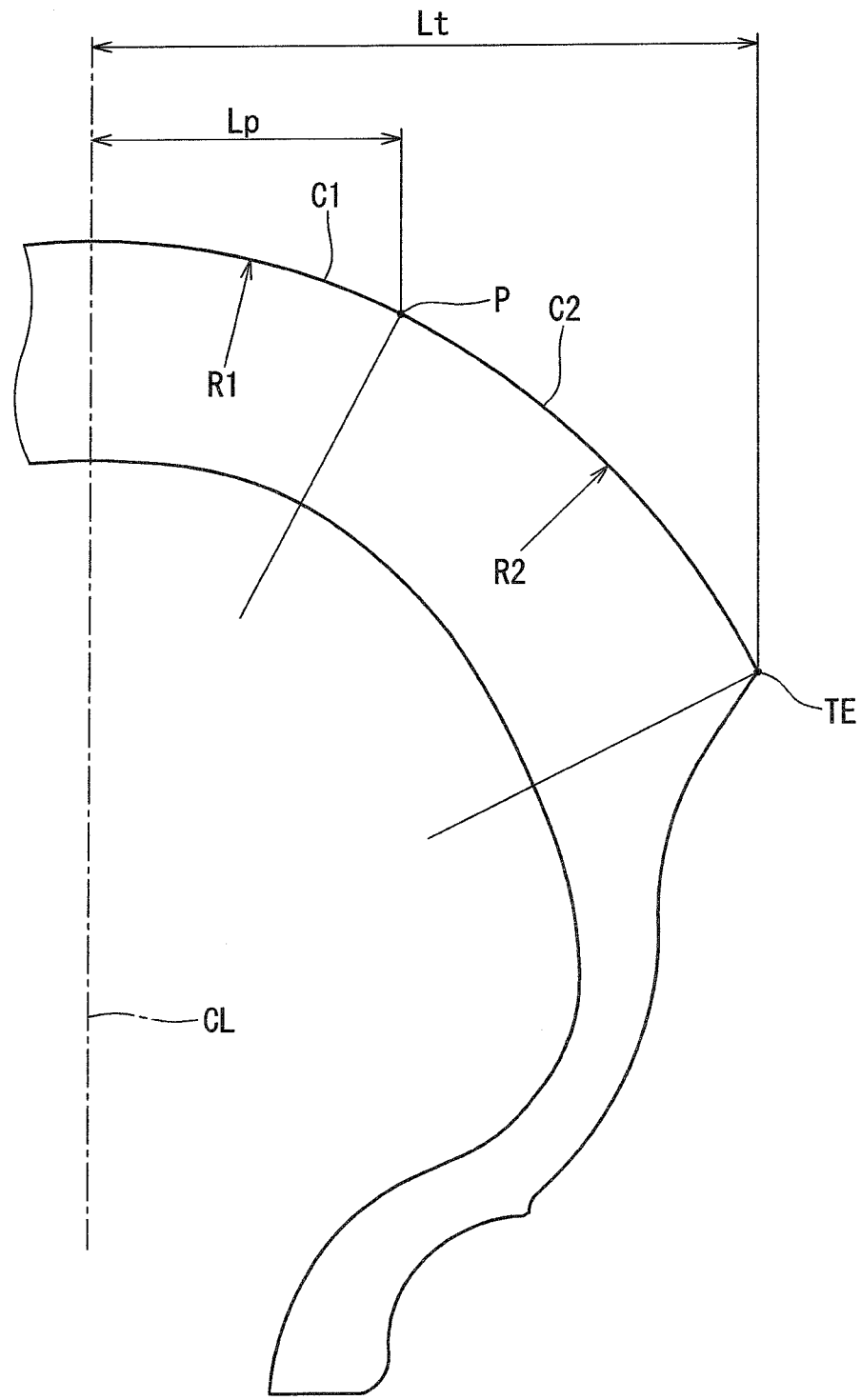
FIG. 3 is an enlarged cross-sectional view of a part of the tire shown in FIG. 1.

FIG. 3 shows a contour (profile) of the outer surface of the tire 2 shown in FIG. 1. The profile of the tire 2 has a shape that is bilaterally symmetric about the alternate long and short dash line CL. In a case where the groove 26 is formed in the tread surface 16, the profile of the tread surface 16 in the profile of the outer surface of the tire 2 is represented as a profile of an imaginary tread surface 16 obtained assuming that the groove 26 is not formed. As shown in FIG. 3, the profile of the tread surface 16 is formed by: an arc C1 that is disposed at the center and projects outward in the radial direction; and a pair of arcs C2 each of which is disposed outward of the arc C1 in the axial direction and projects outward in the radial direction. In FIG. 3, a part of the arc C1 is illustrated. For the arcs C2, only one of the paired arcs C2 is illustrated. A point P is a point of intersection of the arc C1 and each arc C2. The arc C1 and each arc C2 contact with each other at the point P of intersection. In the tire 2, a radius R1 of curvature of the arc C1 is less than a radius R2 of curvature of the arcs C2.

In the present invention, the dimensions and angles of the components of the tire 2 are measured in a state where the tire 2 is mounted to a normal rim, and inflated with air to a normal internal pressure. During the measurement, no load is applied to the tire 2. In the description herein, the normal rim represents a rim that is specified according to the standard with which the tire 2 complies. The "standard rim" in the JATMA standard, the "Design Rim" in the TRA standard, and the "Measuring Rim" in the ETRTO standard are included in the normal rim. In the description herein, the normal internal pressure represents an internal pressure that is specified according to the standard with which the tire 2 complies. The "maximum air pressure" in the JATMA standard, the "maximum value" recited in "TIRE LOAD LIMITS AT VARIOUS COLD INFLATION PRESSURES" in the TRA standard, and the "INFLATION PRESSURE" in the ETRTO standard, are included in the normal internal pressure.

Hereinafter, an effect of the present invention will be described.

The motorcycle tire for an uneven terrain is required to exhibit high impact absorption and handling stability under heavy load. As described above, in the motorcycle tire 2 for an uneven terrain according to the present invention, the profile of the tread surface 16 is formed by the arc C1 disposed at the center, and the pair of arcs C2 each disposed outward of the arc C1 in the axial direction. The radius R1 of curvature of the arc C1 is set to be less than the radius R2 of curvature of the arcs C2. The profile of the center portion of the tread 4 is formed by the arc C1 having a small radius of curvature. Therefore, the tread 4 can be sufficiently deformed in running on an obstacle. The tire 2 is excellent in impact absorption.

The tire 2 includes the rubber reinforcing layers 14 disposed inward of the carcass 10. As described above, the outer ends 40 of the rubber reinforcing layers 14 are disposed outward of the ends TE of the tread surface 16 in the radial direction, and the inner ends 42 of the rubber reinforcing layers 14 are disposed inward of the ends TE in the radial direction. The rubber reinforcing layers 14 contribute to enhancement of stiffness of axially outer portions (buttress portions), of the tread 4, having the profile formed by the respective arcs C2 having a large radius of curvature. In the tire 2, deformation of the buttress portions is appropriately reduced even under heavy load. The tire 2 is excellent in handling stability under heavy load. Further, the rubber reinforcing layers 14 are not disposed on the equator plane. In other words, the outer ends 40 of the rubber reinforcing layers 14 do not reach the equator plane. The rubber reinforcing layers 14 do not prevent deformation of the center portion, of the tread 4, having the profile which is formed by the arc C1 having a small radius of curvature. The tread 4 can be sufficiently deformed in running on an obstacle. The tire 2 is allowed to exhibit both high impact absorption and handling stability under heavy load by appropriate combination of the profile of the tread 4 and the rubber reinforcing layers 14 with each other. The tire 2 is allowed to exhibit both high impact absorption and handling stability under heavy load.

A ratio (R2/R1) of the radius R2 of curvature to the radius R1 of curvature is preferably greater than or equal to 1.1. In the tire 2 in which this ratio is greater than or equal to 1.1, when the motorcycle runs on an obstacle, the tread 4 can be sufficiently deformed. The tire 2 is excellent in impact absorption. The ratio (R2/R1) is preferably not greater than 1.3. In the tire 2 in which this ratio is not greater than 1.3, the deformation of the tread 4 can be maintained within an appropriate range under heavy load. The tire 2 is excellent in handling stability under heavy load.

In view of obtaining both impact absorption and handling stability under heavy load, the radius R1 of curvature is preferably greater than or equal to 45 mm, and preferably not greater than 55 mm. The radius R2 of curvature is preferably greater than or equal to 55 mm, and preferably not greater than 65 mm.

In FIG. 3, a double-headed arrow Lp represents a length, in the axial direction, from the equator plane to the point P of intersection of the arc C1 and each arc C2. A double-headed arrow Lt represents a length, in the axial direction, from the equator plane to each end TE of the tread surface 16. A ratio (Lp/Lt) of the length Lp to the length Lt is preferably greater than or equal to 0.3. In the tire 2 in which this ratio is greater than or equal to 0.3, when the motorcycle runs on an obstacle, the tread 4 can be sufficiently deformed. The tire 2 is excellent in impact absorption. The ratio (Lp/Lt) is preferably not greater than 0.7. In the tire 2 in which this ratio is not greater than 0.7, the deformation of the tread 4 can be maintained within an appropriate range under heavy load. The tire 2 is excellent in handling stability under heavy load.

In FIG. 1, a solid line BL represents a base line. The base line BL represents a line by which a rim diameter (see JATMA) of a rim to which the tire 2 is mounted, is defined. A double-headed arrow H represents a height, in the radial direction, from the base line BL to the point CT of intersection. A double-headed arrow h represents a height, in the radial direction, from the inner end 42 of each rubber reinforcing layer 14 to the outer end 40 thereof. A ratio (h/H) of the height h to the height H is preferably greater than or equal to 0.4. The tire 2 having the rubber reinforcing layers 14 in which the ratio (h/H) is greater than or equal to 0.4, has sufficient stiffness. The tire 2 is excellent in handling stability under heavy load. In this viewpoint, the ratio is more preferably greater than or equal to 0.5. The ratio (h/H) is preferably not greater than 0.8. In the tire 2 having the rubber reinforcing layers 14 in which the ratio (h/H) is not greater than 0.8, stiffness is less likely to become excessive. In the tire 2, the stiffness can be adjusted within an appropriate range. When the motorcycle runs on an obstacle, the tread 4 can be appropriately deformed. The tire 2 is excellent in impact absorption. In this viewpoint, the ratio is more preferably not greater than 0.7.

In FIG. 1, a double-headed arrow hu represents a height, in the radial direction, from the end TE of the tread surface 16 to the outer end 40 of each rubber reinforcing layer 14. A ratio (hu/H) of the height hu to the height H is preferably greater than or equal to 0.05. In the tire 2 in which the ratio (hu/H) is greater than or equal to 0.05, deformation is less likely to become excessive in the buttress portion under heavy load. In this viewpoint, the ratio is more preferably greater than or equal to 0.10. The ratio (hu/H) is preferably not greater than 0.20. In the tire 2 in which the ratio (hu/H) is not greater than 0.20, when the motorcycle runs on an obstacle, the tread 4 can be sufficiently deformed. The tire 2 is excellent in impact absorption. In this viewpoint, the ratio is more preferably not greater than 0.15.

In FIG. 1, a double-headed arrow hl represents a height, in the radial direction, from the inner end 42 of each rubber reinforcing layer 14 to the end TE of the tread surface 16. A ratio (hl/H) of the height hl to the height H is preferably greater than or equal to 0.3. In the tire 2 in which the ratio (hl/H) is greater than or equal to 0.3, the sidewalls 6 have sufficient stiffness under heavy load. The tire 2 is excellent in handling stability under heavy load. In this viewpoint, the ratio is more preferably greater than or equal to 0.4. The ratio (hl/H) is preferably not greater than 0.7. In the tire 2 in which the ratio (hl/H) is not greater than 0.7, stiffness is less likely to become excessive in the sidewall 6 portions. In the tire 2, stiffness of the sidewall 6 portions can be adjusted within an appropriate range. The tire 2 is excellent in impact absorption and handling stability. In this viewpoint, the ratio is more preferably not greater than 0.6.

A ratio (hu/h) of the height hu to the height h is preferably greater than or equal to 0.1, and preferably not greater than 0.4. In the tire 2 in which the ratio (hu/h) is greater than or equal to 0.1, and not greater than 0.4, the stiffness of the buttress portion and the stiffness of the sidewall 6 can be adjusted so as to properly balance with each other. In the tire 2, when the motorcycle body is tilted, angularity due to difference between the stiffness of the buttress portion and the stiffness of the sidewall 6 is reduced. The tire 2 is excellent in turning performance. Further, in the tire 2, the ratio (hu/h) is greater than or equal to 0.1, whereby stiffness is less likely to become excessive in the sidewall 6 portions. In the tire 2, the stiffness of the sidewall 6 portions can be adjusted within an appropriate range. Since the ratio (hu/h) is not greater than 0.4, when the tire 2 runs on an obstacle, the tread 4 can be sufficiently deformed. The tire 2 is allowed to exhibit both impact absorption and handling stability under heavy load. In this viewpoint, the ratio (hu/h) is more preferably greater than or equal to 0.2, and more preferably not greater than 0.3. Since a sum (hu+h) of the height hu and the height hl is the height h, the ratio (hl/h) is preferably greater than or equal to 0.6, and preferably not greater than 0.9. The ratio (hl/h) is more preferably greater than or equal to 0.7, and more preferably not greater than 0.8.

In FIG. 1, a point Pr represents a point, on an inner surface of each rubber reinforcing layer 14, at which the rubber reinforcing layer 14 has the maximum thickness. A double-headed arrow T represents the thickness of the rubber reinforcing layer 14 at the point Pr. The thickness at the point Pr is a distance, between the inner surface and the outer surface of the rubber reinforcing layer 14, measured along the normal line that is drawn from the point Pr. The thickness T is preferably greater than or equal to 0.5 mm. The rubber reinforcing layers 14 in which the thickness T is greater than or equal to 0.5 mm, can contribute to enhancement of stiffness of the tire 2. The tire 2 having the rubber reinforcing layers 14 is excellent in handling stability under heavy load. The thickness T is preferably not greater than 3.0 mm. When the rubber reinforcing layers 14 have the thickness T that is not greater than 3.0 mm, the rubber reinforcing layers 14 can inhibit excessive increase of the stiffness of the tire 2. The stiffness of the tire 2 can be adjusted within an appropriate range. The tire 2 is allowed to exhibit both impact absorption and handling stability.

As shown in FIG. 1, the point Pr at which the thickness is maximum is positioned between the outer end 40 of each rubber reinforcing layer 14, and the inner end 42 thereof. The thickness of each rubber reinforcing layer 14 is almost uniform near the point Pr. The shape of each rubber reinforcing layer 14 is preferably tapered from the portion at which the thickness is uniform toward the outer end 40 and the inner end 42. When the shape of the rubber reinforcing layer 14 is tapered toward the outer end 40, stiffness of the tire 2 is gradually increased from a portion, of the tread 4, near the equator plane where the rubber reinforcing layers 14 are not provided, toward the buttress portion. This reduces angularity caused by the stiffness of the tread 4 being rapidly changed. The tire 2 is excellent in handling stability. The shape of each rubber reinforcing layer 14 may be tapered from the point Pr toward the outer end 40 and the inner end 42 without having a portion in which the thickness is uniform.

In the tire 2, a complex elastic modulus E* of each rubber reinforcing layer 14 is preferably greater than or equal to 2 MPa. The rubber reinforcing layer 14 in which the complex elastic modulus E* is greater than or equal to 2 MPa can contribute to enhancement of stiffness of the tire 2. The tire 2 having the reinforcing layers is excellent in handling stability under heavy load. The complex elastic modulus E* is preferably not greater than 70 MPa. When the rubber reinforcing layers 14 each have the complex elastic modulus E* that is not greater than 70 MPa, the rubber reinforcing layers 14 can inhibit excessive increase of stiffness of the tire 2. The stiffness of the tire 2 can be adjusted within an appropriate range. The tire 2 is allowed to exhibit both impact absorption and handling stability.

In the present invention, the complex elastic modulus E* of the rubber reinforcing layers 14 is measured in compliance with the standard of "JIS K 6394" by using the viscoelasticity spectrometer (manufactured by Iwamoto Seisakusho) under the following conditions.

Initial strain: 10%
Amplitude: ±2.0%
Frequency: 10 Hz
Deformation mode: tension
Measurement temperature: 100° C.

In the tire 2, a hardness Hs of each rubber reinforcing layer 14 is preferably greater than or equal to 40. The rubber reinforcing layers 14 in which the hardness Hs is greater than or equal to 40 can contribute to enhancement of stiffness of the tire 2. The tire 2 having the reinforcing layers is excellent in handling stability under heavy load. The hardness Hs is preferably not greater than 80. When the rubber reinforcing layers 14 each have the hardness Hs that is not greater than 80, the rubber reinforcing layers 14 can inhibit excessive increase of the stiffness of the tire 2. The stiffness of the tire 2 can be adjusted within an appropriate range. The tire 2 is allowed to exhibit both impact absorption and handling stability.

In the present invention, the hardness Hs is a JIS-A hardness. The hardness is measured in the environment at 25° C. by using a type A durometer in compliance with the standard of "JIS-K6253". More specifically, the hardness is measured by the type A durometer being pressed against the cross-sectional surface shown in FIG. 1.

EXAMPLES

Hereinafter, effects of the present invention will become apparent according to examples. However, the present invention should not be restrictively construed based on the description of examples.

Example 1

A tire, of example 1, having the structure shown in FIG. 1 was obtained. The tire was of a tube type. The size of the tire was 80/100-21. Specifications of the tire are indicated in Table 1. The radius R1 of curvature of the arc C1 was 50 mm, and the radius R2 of curvature of the arcs C2 was 60 mm. Therefore, the ratio (R2/R1) was 1.2. The length Lp from the equator plane to the point P of intersection of the arc C1 and each arc C2 was 24 mm. The length Lt, in the radial direction, from the equator plane to the end TE of the tread surface 16 was 49 mm. The height H was 70 mm. The complex elastic modulus E* of the rubber reinforcing layer was 3 MPa. The hardness Hs of the rubber reinforcing layer was 50. An angle of each cord of the first ply relative to the equator plane was 30°. An angle of each cord of the second ply relative to the equator plane was −30°.

Comparative Example 1

A tire of comparative example 1 was obtained in the same manner as for example 1 except that no rubber reinforcing layer was provided, and the ratio (R2/R1) was as indicated in Table 1. Comparative example 1 represents a conventional tire.

Comparative Example 2

A tire of comparative example 2 was obtained in the same manner as for example 1 except that no rubber reinforcing layer was provided.

Reference Example 1

A tire of reference example 1 was obtained as a tubeless tire having no rubber reinforcing layer.

Comparative Examples 3 to 4 and Examples 2 to 4

Tires of comparative examples 3 to 4 and examples 2 to 4 were obtained in the same manner as for example 1 except that the ratio (R2/R1) was as indicated in Table 2. The ratio (R2/R1) was changed such that the height in the tire radial direction and positions of the ends TE of the tread were not changed, and the radius R1 of curvature and the radius R2 of curvature were changed as indicated in Table 2.

Comparative Example 5 and Examples 5 to 9

Tires of comparative example 5 and examples 5 to 9 were obtained in the same manner as for example 1 except that the ratio (h/H) was as indicated in Table 3. The ratio (h/H) was changed such that the length hu was uniform and the length h1 was changed. Therefore, the ratio (hl/H) was also changed.

Comparative Examples 6 to 7 and Examples 10 to 12

Tires of comparative examples 6 to 7 and examples 10 to 12 were obtained in the same manner as for example 1 except that the ratio (hu/H) was as indicated in Table 4. In the tire of comparative example 7, the outer ends of the rubber reinforcing layers reached the equator plane. The ratio (hu/H) was changed such that the length hl was uniform and the length hu was changed. Therefore, the ratio (h/H) was also changed.

Comparative Examples 8 to 9 and Examples 13 to 15

Tires of comparative examples 8 to 9 and examples 13 to 15 were obtained in the same manner as for example 1 except that the ratio (hu/h) was as indicated in Table 5.

Examples 16 to 19

Tires of examples 16 to 19 were obtained in the same manner as for example 14 except that the maximum thickness T was as indicated in Table 6.

[Evaluation of Impact Absorption and Handling Stability]

The sample tire was mounted to a front wheel (rim size: 1.60×21 inch) of a two-wheeled automotive vehicle (four-stroke cycle) which was dedicated to motocross racing and had an engine displacement of 450 cc, and the tire was inflated with air to an internal pressure of 80 kPa. A commercially available tire (size: 120/80-19) was mounted to a rear wheel (rim size: 2.15×19 inch), and the tire was inflated with air to an internal pressure of 80 kPa. This two-wheeled automotive vehicle was caused to run on a motocross course, and a sensory evaluation was made by a rider. The evaluation was made for impact absorption and handling stability. For handling stability, stability of landing in jump, controllability, and grip performance were evaluated. The results are indicated below in Table 1 to Table 6 with the result of comparative example 2 being 5. The greater the value is, the better the evaluation result is.

TABLE 1

Evaluation result

| | Comparative example 1 | Comparative example 2 | Example 1 | Reference Example 1 |
|---|---|---|---|---|
| Radius R1 of curvature [mm] | 56 | 50 | 50 | 50 |
| Radius R2 of curvature [mm] | 50 | 60 | 60 | 60 |
| Ratio (R2/R1) | 0.9 | 1.2 | 1.2 | 1.2 |
| Ratio (h/H) | — | — | 0.50 | — |
| Ratio (hu/H) | — | — | 0.10 | — |
| Ratio (hl/H) | — | — | 0.40 | — |
| Ratio (hu/h) | — | — | 0.20 | — |
| Maximum thickness T [mm] | — | — | 1.0 | — |
| Impact absorption | 3 | 5 | 7 | 4 |
| Landing in jump | 5 | 5 | 7 | 6 |
| Controllability | 4 | 5 | 7 | 5 |
| Grip performance | 4 | 5 | 7 | 4 |

TABLE 2

Evaluation result

| | Comparative example 3 | Comparative example 4 | Example 2 | Example 3 | Example 4 |
|---|---|---|---|---|---|
| Radius R1 of curvature [mm] | 56 | 53 | 52 | 48 | 46 |
| Radius R2 of curvature [mm] | 50 | 53 | 57 | 62 | 64 |
| Ratio (R2/R1) | 0.9 | 1.0 | 1.1 | 1.3 | 1.4 |
| Ratio (h/H) | 0.50 | 0.50 | 0.50 | 0.50 | 0.50 |
| Ratio (hu/H) | 0.10 | 0.10 | 0.10 | 0.10 | 0.10 |
| Ratio (hl/H) | 0.40 | 0.40 | 0.40 | 0.40 | 0.40 |
| Ratio (hu/h) | 0.20 | 0.20 | 0.20 | 0.20 | 0.20 |
| Maximum thickness T [mm] | 1.0 | 1.0 | 1.0 | 1.0 | 1.0 |
| Impact absorption | 5 | 5 | 7 | 7 | 7 |
| Landing in jump | 6 | 6 | 7 | 6 | 6 |
| Controllability | 4 | 5 | 6 | 6 | 5 |
| Grip performance | 5 | 6 | 7 | 7 | 6 |

TABLE 3

Evaluation result

| | Comparative example 5 | Example 5 | Example 6 | Example 7 | Example 8 | Example 9 |
|---|---|---|---|---|---|---|
| Radius R1 of curvature [mm] | 50 | 50 | 50 | 50 | 50 | 50 |
| Radius R2 of curvature [mm] | 60 | 60 | 60 | 60 | 60 | 60 |
| Ratio (R2/R1) | 1.2 | 1.2 | 1.2 | 1.2 | 1.2 | 1.2 |
| Ratio (h/H) | 0.10 | 0.30 | 0.40 | 0.70 | 0.80 | 0.85 |
| Ratio (hu/H) | 0.10 | 0.10 | 0.10 | 0.10 | 0.10 | 0.10 |
| Ratio (hl/H) | 0.00 | 0.20 | 0.30 | 0.60 | 0.70 | 0.75 |
| Ratio (hu/h) | 1.0 | 0.33 | 0.25 | 0.14 | 0.13 | 0.12 |
| Maximum thickness T [mm] | 1.0 | 1.0 | 1.0 | 1.0 | 1.0 | 1.0 |
| Impact absorption | 5 | 6 | 7 | 7 | 6 | 6 |
| Landing in jump | 5 | 6 | 6 | 7 | 7 | 7 |
| Controllability | 5 | 6 | 7 | 7 | 6 | 5 |
| Grip performance | 6 | 7 | 7 | 7 | 6 | 6 |

TABLE 4

Evaluation result

| | Comparative example 6 | Example 10 | Example 11 | Example 12 | Comparative example 7 |
|---|---|---|---|---|---|
| Radius R1 of curvature [Mm] | 50 | 50 | 50 | 50 | 50 |
| Radius R2 of curvature [mm] | 60 | 60 | 60 | 60 | 60 |
| Ratio (R2/R1) | 1.2 | 1.2 | 1.2 | 1.2 | 1.2 |
| Ratio (h/H) | 0.40 | 0.45 | 0.55 | 0.60 | 0.66 |
| Ratio (hu/H) | 0.00 | 0.05 | 0.15 | 0.20 | 0.22 |
| Ratio (hl/H) | 0.40 | 0.40 | 0.40 | 0.40 | 0.40 |
| Ratio (hu/h) | 0.00 | 0.11 | 0.27 | 0.33 | 0.35 |
| Maximum thickness T [mm] | 1.0 | 1.0 | 1.0 | 1.0 | 1.0 |
| Impact absorption | 6 | 7 | 7 | 6 | 5 |
| Landing in jump | 5 | 6 | 7 | 7 | 6 |
| Controllability | 5 | 6 | 7 | 6 | 5 |
| Grip performance | 5 | 6 | 7 | 7 | 5 |

TABLE 5

Evaluation result

| | Comparative example 8 | Example 13 | Example 14 | Example 15 | Comparative example 9 |
|---|---|---|---|---|---|
| Radius R1 of curvature [mm] | 50 | 50 | 50 | 50 | 50 |
| Radius R2 of curvature [mm] | 60 | 60 | 60 | 60 | 60 |
| Ratio (R2/R1) | 1.2 | 1.2 | 1.2 | 1.2 | 1.2 |
| Ratio (h/H) | 0.50 | 0.50 | 0.50 | 0.50 | 0.50 |
| Ratio (hu/H) | 0.0 | 0.05 | 0.15 | 0.20 | 0.22 |
| Ratio (hl/H) | 0.50 | 0.45 | 0.35 | 0.30 | 0.28 |
| Ratio (hu/h) | 0.00 | 0.10 | 0.30 | 0.40 | 0.44 |
| Maximum thickness T [mm] | 1.0 | 1.0 | 1.0 | 1.0 | 1.0 |
| Impact absorption | 6 | 7 | 6 | 6 | 5 |
| Landing in jump | 6 | 6 | 7 | 6 | 6 |
| Controllability | 4 | 6 | 7 | 6 | 4 |
| Grip performance | 5 | 6 | 7 | 6 | 4 |

TABLE 6

Evaluation result

|  | Example 16 | Example 17 | Example 18 | Example 19 |
|---|---|---|---|---|
| Radius R1 of curvature [mm] | 50 | 50 | 50 | 50 |
| Radius R2 of curvature [mm] | 60 | 60 | 60 | 60 |
| Ratio (R2/R1) | 1.2 | 1.2 | 1.2 | 1.2 |
| Ratio (h/H) | 0.50 | 0.50 | 0.50 | 0.50 |
| Ratio (hu/H) | 0.15 | 0.15 | 0.15 | 0.15 |
| Ratio (hl/H) | 0.35 | 0.35 | 0.35 | 0.35 |
| Ratio (hu/h) | 0.30 | 0.30 | 0.30 | 0.30 |
| Maximum thickness T [mm] | 0.3 | 0.5 | 3.0 | 3.5 |
| Impact absorption | 6 | 6 | 6 | 5 |
| Landing in jump | 5 | 5 | 7 | 7 |
| Controllability | 5 | 6 | 6 | 6 |
| Grip performance | 6 | 6 | 6 | 6 |

As indicated in Table 1 to Table 6, evaluation of the tires of examples is higher than the evaluation of the tires of comparative examples. The evaluation result clearly indicates that the present invention is superior.

INDUSTRIAL APPLICABILITY

The tire described above is applicable to various two-wheeled automotive vehicles.

DESCRIPTION OF THE REFERENCE CHARACTERS

4 . . . tread
6 . . . sidewall
8 . . . bead
10 . . . carcass
10a . . . first ply
10b . . . second ply
10c . . . third ply
12 . . . chafer
14 . . . rubber reinforcing layer
16 . . . tread surface
18 . . . base
20 . . . main body
22 . . . block
22a . . . center block
22b . . . middle block
22c . . . shoulder block
24 . . . recess
26 . . . groove
28 . . . core
30 . . . apex
32 . . . first main body portion
34 . . . first turned-up portion
36 . . . second main body portion
38 . . . second turned-up portion
40 . . . outer end
42 . . . inner end

The invention claimed is:

1. A motorcycle tire for an uneven terrain, the motorcycle tire comprising:
    a tread having an outer surface that forms a tread surface, wherein the tread includes multiple blocks that extend outward in a radial direction;
    a pair of sidewalls that extend inward from ends, respectively, of the tread in the radial direction;
    a pair of beads disposed inward of the sidewalls, respectively, in the radial direction;
    a carcass that is extended on and between one of the beads and the other of the beads in a portion inward of the tread in the radial direction; and
    a pair of rubber reinforcing layers disposed inward of the carcass near ends, respectively, of the tread surface, wherein
    a profile of the tread surface is formed by: an arc C1 that is disposed at a center in an axial direction, and that projects outward in the radial direction; and a pair of arcs C2 each of which is disposed outward of the arc C1 and each of which projects outward in the radial direction,
    the arc C1 contacts with the arcs C2,
    a radius R1 of curvature of the arc C1 is less than a radius R2 of curvature of each arc C2,
    a ratio (R2/R1) of the radius R2 of curvature to the radius R1 of curvature is greater than or equal to 1.1, and not greater than 1.3,
    outer ends of the rubber reinforcing layers are disposed outward of the ends of the tread surface in the radial direction,
    inner ends of the rubber reinforcing layers are disposed inward of the ends of the tread surface in the radial direction,
    the rubber reinforcing layers are not disposed on an equator plane,
    when h represents a height, in the radial direction, from the inner end of each rubber reinforcing layer to the outer end thereof, H represents a height, in the radial direction, from a base line to a point of intersection of the equator plane and an inner surface of the tire, hu represents a height, in the radial direction, from the end of the tread surface to the outer end of the rubber reinforcing layer, and hl represents a height, in the radial direction, from the inner end of the rubber reinforcing layer to the end of the tread surface,
    a ratio (h/H) of the height h to the height H is greater than or equal to 0.5, and not greater than 0.7,
    a ratio (hu/H) of the height hu to the height H is greater than or equal to 0.1, and not greater than 0.15, and
    a ratio (hl/H) of the height hl to the height H is greater than or equal to 0.4, and not greater than 0.6.

2. The motorcycle tire for an uneven terrain according to claim 1, wherein
    the rubber reinforcing layers have a maximum thickness between the outer ends and the inner ends, respectively, and
    the rubber reinforcing layers have a shape that is tapered from a portion having the maximum thickness toward the outer ends and the inner ends, respectively.

3. The motorcycle tire for an uneven terrain according to claim 1, wherein the maximum thickness of each rubber reinforcing layer is greater than or equal to 0.5 mm, and not greater than 3.0 mm.

* * * * *